United States Patent Office 3,407,237
Patented Oct. 22, 1968

3,407,237
PREPARATION OF HYDROXYLATED
AROMATIC COMPOUNDS
Jerome A. Vesely, Park Ridge, Ill., assignor to Universal Oil Products Company, Des Plaines, Ill., a corporation of Delaware
No Drawing. Filed Nov. 8, 1965, Ser. No. 506,851
6 Claims. (Cl. 260—621)

ABSTRACT OF THE DISCLOSURE

Preparation of a hydroxylated aromatic compound by treating a t-alkyl substituted aromatic compound with $H_2O_2$ in the presence of HF at a temperature of $-10°$ C. to $100°$ C.

---

This invention relates to a process for the preparation of hydroxylated aromatic compounds, and more particularly to a process for preparing hydroxylated aromatic compounds via hydroxylation accompanied by an alkyl transfer reaction.

Aromatic compounds which contain one or more hydroxyl substituents on the aromatic ring will find a wide variety of uses in the chemical field. For example, phenol is an important intermediate in the preparation of phenolic resins, epoxy resins, nylon, weed killers, as a selective solvent for refining lubricating oils, salicylic acid, picric acid, germicidal paints, and pharmaceuticals. Hydroxynaphthalene which is also known as alpha-napthol or beta-naphthol is used in dyes, synthetic perfumes, pigments, anti-oxidants for rubber, fats, oils, insecticides or in organic synthesis of fungicides, pharmaceutics and perfumes.

Dihydroxylated aromatics such as hydroquinone, catechol, dihydroxynaphthalene, etc., find a wide variety of uses in the chemical field. For example, hydroquinone is an important chemical which is utilized in photographic developers, in dye intermediates, in medicine, as an antioxidant for fats and oils, as an inhibitor in coating compounds for rubber, stone and textiles, in paints and varnishes, as well as in motor fuels and oils. In addition, it is an intermediate for preparing mono- and dibenzyl ethers of hydroquinone, the latter compounds being used in perfumes, plastics and pharmaceutics. Catechol finds a wide variety of uses as an antiseptic, in photography, dyestuffs, antioxidants and light stabilizers; furthermore, it is an intermediate for the preparation of the dimethyl ether of catechol which is used as an antiseptic and for the monomethyl ether of catechol which is guaiacol, guaiacol being an important component of many medicines.

Hydroquinone is ordinarily prepared by oxidizing aniline to quinone utilizing manganese dihydroxide and thereafter reducing the quinone to hydroquinone. Likewise, catechol is usually prepared by fusion of o-phenolsulfonic acid with caustic potash at a relatively high temperature of about $350°$ C. or by heating guaiacol with hydriodic acid. This latter step is somewhat expensive and time consuming inasmuch as guaiacol is prepared by the somewhat intricate process system of extracting beechwood creosote with alcoholic potash, washing with ether, crystallizing the potash compound with alcohol and decomposing the compound with dilute sulfuric acid; or guaiacol can be obtained by diazotization of o-anisidine followed by dilute sulfuric acid.

Polyhydroxylated aromatic compounds such as pyrogallol (1,2,3-trihydroxybenzene) may be used as a protective colloid in the preparation of metallic colloidal solutions, in photography, dyes, synthetic drugs, process engraving, antioxidants in lubricating oils, etc. Phloroglucinol (1,3,5-trihydroxybenzene) is used in analytical chemistry, medicines and in the preparation of pharmaceuticals, dyes and resins.

In view of the importance of the aforementioned hydroxylated aromatic compounds the necessity of obtaining these compounds by relatively inexpensive procedures is of importance to the chemical industry. It is therefore an object of this invention to provide an improved process for obtaining hydroxylated aromatic compounds.

A further object of this invention is to provide a process for preparing hydroxylated aromatic compounds utilizing starting materials which are readily available in accomplishing the desired result in a simple one step process which includes an alkyl transfer reaction.

In one aspect, an embodiment of this invention resides in a process for the preparation of a hydroxylated aromatic compound which comprises treating a t-alkyl substituted aromatic compound with hydrogen peroxide in the presence of hydrogen fluoride at hydroxylation conditions, and recovering the resultant hydroxylated aromatic compounds.

A specific embodiment of this invention is for the preparation of hydroxylated aromatic compounds which comprises treating t-butylbenzene with an aqueous solution of hydrogen peroxide in which said hydrogen peroxide is present in the aqueous solution in an amount of from about 5% to about 90% at a temperature in the range of from about $0°$ to about $40°$ C., and ambient pressure, and recovering the resultant phenol, hydroquinone and catechol.

Other objects and embodiments will be found in the following further detailed description of this invention.

As hereinbefore set forth, the present invention is directed to a process for preparing hydroxylated aromatic compounds via hydroxylation accompanied by alkyl transfer by treating a t-alkyl substituted aromatic compound with hydrogen peroxide in the presence of a catalyst comprising hydrogen fluoride. Examples of t-alkyl substituted aromatic compounds which may be utilized as starting materials in the process of this invention include both mono- and polycyclic aromatic compounds containing a tertiary alkyl substituent, said tertiary alkyl substituent containing from 4 to about 20 carbon atoms and preferably containing from 4 to about 8 carbon atoms. Specific examples of these t-alkyl substituted aromatic hydrocarbons which may be used include t-butylbenzene,
p-t-butyltoluene,
di-t-butylbenzene,
p-t-amyltoluene,
t-amylbenzene,
t-hexylbenzene,
t-heptylbenzene,
t-octylbenzene,
p-t-butylphenol,
p-t-amylphenol,
p-t-hexylphenol,
o-t-butylphenol,
o-t-amylphenol,
t-butylnaphthalene,
t-amylnaphthalene,
t-hexylnaphthalene,
t-heptylnaphthalene,
t-octylnaphthalene,
1-t-butyl-2-naphthol,
1-t-amyl-2-naphthol,
1-t-hexyl-2-naphthol,
t-butylanthracene,
t-amylanthracene,
t-hexylanthracene,
t-heptylanthracene,
t-octylanthracene, 1-t-butyl-2-anthracol,
1-t-amyl-2-anthracol,
1-t-hexyl-2-anthracol,
t-butylphenanthrene,
t-amylphenanthrene,
t-hexylphenanthrene,
t-heptylphenanthrene,
t-octylphenanthrene,
1-t-butyl-2-phenanthracol,
1-t-amyl-2-phenanthracol,
t-butylchrysene,
t-amylchrysene,
t-hexylchrysene,
t-heptylchrysene,
t-octylchrysene,
1-t-butyl-2-chrysol,
1-t-amyl-2-chrysol,
t-butylpyrene,
t-amylpyrene,
t-hexylpyrene,
t-heptylpyrene,
t-octylpyrene, etc.,
p-t-butylanisole,
p-t-amylanisole,
o-t-butylanisole,
o-t-butylphenetol,
p-t-butylphenetol,
o-t-butylchlorobenzene,
p-t-butylchlorobenzene,
o-t-amylchlorobenzene,
p-t-amylchlorobenzene,
1-t-butyl-2-chloro-naphthalene,
1-t-amyl-2-chloro-naphthalene,
1,1-bis(p-t-butylphenyl)-1-desoxy-D-gluticol,
1,1-bis(o-t-butylphenyl)-1-desoxy-D-gluticol, the corresponding t-alkyl aromatic derivatives of other hexoses such as fructose, sorbose, tagatose, psicose, idose, gulose, talose, etc., glycolaldehyde, trioes, tetraoses, pentoses, etc. It is to be understood that the aforementioned t-alkyl substituted compounds are only representative of the class of compounds which may be used, and that the present invention is not necessarily limited thereto.

The process of this invention is effected by treating a t-alkyl substituted aromatic compound of the type hereinbefore set forth in greater detail with hydrogen peroxide in the presence of a catalyst comprising hydrogen fluoride. The hydrogen peroxide may be present in an aqueous solution containing from 5 up to 90% or more hydrogen peroxide. The preferable hydrogen peroxide solution which is used will contain a 30–50% or higher concentration of hydrogen peroxide inasmuch as, when utilizing a lesser amount, the aqueous portion of the solution will tend to dilute the catalyst which is preferably charged to the reaction zone in anhydrous form. When the concentration of the hydrogen fluoride catalyst falls below a figure of about 60 to 70% the reaction will slow down and eventually cease, therefore it is necessary to maintain the concentration of hydrogen fluoride in an amount greater than 60% and preferably greater than 80%, thus necessitating the use of a relatively concentrated hydrogen peroxide solution. It is also contemplated, if so desired, that an additional compound such as boron trifluoride or a ferrous fluoborate having the formula: $FeF_2 \cdot BF_3$ may be utilized as a promoter to increase the catalytic acidity and thereby permitt he reaction to proceed in such a manner as to provide increased yields of the desired product. In addition, the reaction is effected under hydroxylation conditions which will include temperatures ranging from about −10° up to about 100° C. or more and preferably at a temperature in the range of from about 0° to about 40° C. The reaction pressure which is utilized will preferably comprise ambient pressure, although somewhat higher pressures may be used, the pressure being that which is necessary to maintain a substantial portion of the reactants and the catalyst in the liquid phase.

The obtention of either a monohydroxylated aromatic compound or polyhydroxylated aromatic compound can be varied according to the amount of tertiary alkyl substituted aromatic compound which is treated with the hydrogen peroxide. For example, if a monohydroxylated aromatic compound is desired, an excess of the starting t-alkyl substituted aromatic compound will be used. Conversely, if a polyhydroxylated aromatic compound comprises the desired product the relative amount of hydrogen peroxide which is used will be increased. Generally speaking, the t-alkyl substituted aromatic compound will be present in a mole ratio in the range of from about 3:1 to about 15:1 moles of t-alkyl substituted aromatic compound per mole of hydrogen peroxide, although greater or lesser amounts of aromatic compound may also be used.

The process of the present invention may be effected in either a batch or continuous type operation. For example, when a batch type operation is used, a quantity of the tertiary alkyl substituted aromatic compound is placed in an appropriate apparatus, such as for example, a stirred autoclave, along with the hydrogen fluoride. The hydrogen peroxide is added thereto and the reaction allowed to proceed for a predetermined residence time under the hydroxylation condition hereinbefore set forth in greater detail. The residence time may vary from about 0.5 hour up to about 5 hours or more in duration. Upon completion of the desired residence time, the catalyst is purged from the reactor utilizing a stream of inert gas such as nitrogen and the reaction product thereafter recovered. Following this, the reaction product is subjected to conventional means for recovery, said means including washing the product with an inert organic solvent, neutralization of any hydrogen fluoride which may still be present, flashing off the solvent and subjecting the reaction product to fractional distillation to recover the desired compounds.

It is also contemplated that the process of this invention may effected in a continuous manner of operation. When such a process is used, the tertiary alkyl substituted aromatic compound is continuously charged to a reaction zone which is maintained at the proper operating conditions of temperature and pressure. In addition, the hydrogen peroxide in the form of an aqueous solution containing from 5% up to about 90% or more hydrogen peroxide is continuously charged to the reaction zone. The reaction is allowed to proceed in the presence of a hydrogen fluoride catalyst present in the reactor or continuously charged thereto for a predetermined time of from about 0.01 hour to about 2 hours, following which the reactor effluent is continuously withdrawn. The hydrogen peroxide and hydrogen fluoride may be premixed, if so desired, and the resulting solution fed continuously to the reactor. The reaction product is separated from the catalyst and the former is subjected to treatment similar to that hereinbefore set forth to recover the desired hydroxylated aromatic compounds.

Examples of hydroxylated aromatic compounds (the term "hydroxylated aromatic compounds" as used in the present specification and appended claim referring to both monohydroxylated and polyhydroxylated aromatic compounds) which may be prepared according to the process of this invention include phenol, hydroquinone, catechol, phloroglucinol, pyrogallol, 1-hydroxynapthalene, 2-hydroxynapththalene, 1,4-dihydroxynaphthalene, 1,5-dihydroxynaphthalene, 1-hydroxyanthracene, 2-hydroxyanthracene, 1,5-dihydroxyanthracene, C-methylated derivatives of these, etc. It is to understood that the aforementioned hydroxylated aromatic compounds are only representative of the class of compounds which may be prepared and that the present invention is not necessarily limited thereto.

Inasmuch as the hydroxylation of the aromatic compound is accompanied by the alkyl transfer reaction it is contemplated within the scope of this invention that mixtures of a tertiary alkyl substituted aromatic compound and an aromatic compound or of a di-tertiary substituted alkyl aromatic compound and an aromatic compound may be utilized, the aromatic compound such as benzene or naphthalene, etc., acting as an acceptor molecule and transferring the tertiary alkyl group, thus forming more tertiary alkyl substituted aromatic compounds available for possible hydroxylation of the aromatic compound (i.e., recycling). Thus, mixtures of t-butylbenzene and benzene, di - t - butylbenzene and benzene, t-amylbenzene and benzene, t-butylnaphthalene and naphthalene, etc., may serve for the starting materials for the process of this invention.

It is significant to not that the present process offers a means of converting benzene, for example, to phenol via hydrogen fluoride catalyzed reaction with hydrogen peroxide. Treatment of benzene as such with hydrogen peroxide in the presence of hydrogen fluoride yields very little or no phenol. On the other hand, if the benzene is first alkylated to produce t-alkylbenzene and the latter is then treated with hydrogen peroxide and hydrogen fluoride in the presence or absence of benzene, there is produced a high yield of phenol together with t-alkyl-benzene or di-t-alkylbenzene, respectively.

The following examples are given to illustrate the process of the present invention which, however, are not intended to limit the generally broad scope of the present invention in strict accordance therewith.

Example I

In this example, 268 g. (2.0 mole) of t-butylbenzene was placed in a stainless steel turbomixer autoclave. Following this, the autoclave was sealed and 452 g. of hydrogen fluoride was charged thereto. In addition, 21.9 g. of a 30% aqueous hydrogen peroxide solution was gradually charged to the reactor during a period of 28 minutes. The mixture was stirred for an additional period of 7 minutes, the temperature during the entire 35 minutes of contact time being maintained in a range of from about 0° to about 6° C., the subambient temperature being accomplished by immersing the autoclave in an ice bath. At the end of the contact time, the hydrogen fluoride was swept out of the autoclave with a stream of nitrogen for a period of about 2 hours before the autoclave was opened.

The reaction product was transferred to a beaker and the reactor parts were washed with benzene, the washings being added to the reaction product. The solution was then decanted into another beaker which resulted in separating out a small amount of an aqueous acid phase which contained a benzene-insoluble product. The decanted benzene solution was treated to remove residual hydrogen fluoride, extracted with aqueous alkali, and distilled. There was obtained 42 g. of di-t-butylbenzene. The aqueous alkaline solution was acidified with hydrochloric acid and ether-extracted. The ether was distilled from the extract, leaving a residue which contained a mixture of phenol, catechol, hydroquinone and traces of t-butylphenol, said composition being determined by infrared analysis. The amounts correspond to theoretical yields (based on the hydrogen peroxide) of 30, 13, and 35% respectively.

Example II

In this example, 268 g. (2.0 mole) of t-butylbenzene and 234 g. of benzene were placed in an autoclave of the type hereinbefore set forth in Example I above. Following this, the autoclave was sealed and 233 g. of hydrogen fluoride charged thereto. Thereafter 21.9 g. of a 30% aqueous hydrogen peroxide solution were slowly charged to said autoclave, the addition of the hydrogen peroxide being accomplished during a period of 45 minutes. At the end of the peroxide addition the mixture was stirred for an additional period of 10 minutes, the temperature of the autoclave during the entire contact time being maintained in a range of from about 0° to about 6° C. by means of an icebath. At the end of the total contact time of 55 minutes, the hydrogen fluoride was purged from the autoclave by means of a stream of nitrogen for a period of 2 hours. The autoclave was then opened and the reaction product recovered. As set forth in Example I above, the autoclave and parts thereof were washed with benzene and the washings combined with the reaction product. When the solution was decanted into another vessel a wash separation occured, therebeing a benzene-insoluble product and an aqueous acid phase. The benzene solution was neutralized to remove residual hydrogen fluoride, and then extracted with aqueous alkali. Distillation of the benzene solution yielded t-butylbenzene (about 229 g.) and p-di-t-butylbenzene (16 g.). The alkaline extract was acidified, the liberated phenolic compounds were taken up in ether, and the ether was distilled off. The composition of the residue was determined by means of gas-liquid chromatography and infra-red spectroscopy and shown to contain phenol, catechol, hydroquinone and p-t-butylphenol in amounts corresponding to 40, 7, 16 and 6% respectively of the theoretical yields.

Example III

In this example, 40.5 g. (0.21 mole) of p-di-t-butylbenzene and 65 g. (0.83 mole) of benzene were placed in an autoclave and treated with 433 g. of hydrogen fluoride and 21.9 g. of a 30% hydrogen peroxide solution. The autoclave was maintained at a temperature in the range of from about 0° to about 6° C. while adding the hydrogen peroxide during a period of 55 minutes. Upon completion of the addition of the hydrogen peroxide the reaction mixture was stirred for an additional 10 minutes. At the end of this time, the hydrogen fluoride was purged from the autoclave by means of a stream of nitrogen and the autoclave was opened. The reaction product was treated in a manner similar to that hereinbefore set forth, that is, neutralization of residual hydrogen fluoride in the benzene layer, extraction with aqueous alkali and distillation to recover mono- and di-t-butylbenzene. The alkali-soluble product was found to consist of phenol (33% yield), catechol (21% yield), hydroquinone (30% yield) and t-butylphenol (1%).

Example IV

In this example, 316 g. (2.0 mole) of t-amylbenzene is placed in an autoclave which is maintained at a temperature in the range of from about 0° to about 6° C. by being immersed in an icebath. Following this, 425 g. of hydrogen fluoride and 22 g. of a 30% hydrogen peroxide solution are added thereto, the addition of the hydrogen peroxide being accomplished during a period of about 45 minutes. At the end of this time, the contents are stirred for an additional 10 minutes following which the hydrogen fluoride is purged from the autoclave by means of a stream of nitrogen. The autoclave is opened and the reaction product is treated in a manner similar to that set forth in the above examples. After neutralization of any residual hydrogen fluoride in the benzene layers and extraction of phenolic product with alkali, the alkali-insoluble and alkali-soluble products are investigated as set forth above. Analysis by means of an infra-red apparatus and by a gas-liquid chromatograph will disclose the presence of phenol, catechol and hydroquinone as well as di-t-amylbenzene.

Example V

In this example, 368 g. (2.0 mole) of 1-t-butylnaphthalene is treated with hydrogen fluoride and hydrogen peroxide in a manner similar to that set forth in Example I above under similar reaction conditions. At the end of the contact time, the hydrogen fluoride is purged from the reactor by means of a stream of nitrogen for a period of 2 hours and the reactor opened. The reaction products are recovered in the manner described in previous examples.

Infra-red and gas-liquid chromatographic analysis will disclose the presence of hydroxynaphthalene, 1,2-dihydroxynaphthalene and di-t-butylnaphthalene.

Example VI

In this experiment, 396 g. (2.0 mole) of 1-t-amylnaphthalene is treated with hydrogen fluoride and hydrogene peroxide in a manner similar to that set forth in the above examples. After recovery of the product in the usual manner, analysis will disclose the presence of hydroxynaphthalene, dihydroxynaphthalene and di-t-amylnaphthalene.

I claim as my invention:

1. A process for the preparation of a hydroxylated aromatic hydrocarbon which comprises admixing a mono-t-alkylated or di-t-alkylated aromatic hydrocarbon, said hydrocarbon being otherwise unsubstituted, in which the t-alkyl substituents is nuclearly attached and contain from 4 to about 20 carbon atoms with hydrogen fluoride at a concentration of at least about 60% HF, slowly adding to the resulting mixture an aqueous hydrogen peroxide solution containing from about 5% to about 90% of hydrogen peroxide under hydroxylation conditions including a temperature of from about −10° C. to about 100° C., and recovering the resultant hydroxylated aromatic hydrocarbons, the major portion of which being devoid of said t-alkyl substituents and having one or two hydroxyl groups per molecule introduced by the hydroxylation reaction.

2. The process as set forth in claim 1, further characterized in that said hydroxylation conditions include a temperature in the range of from about 0° to about 40° C. and ambient pressure.

3. The process as set forth in claim 2, further characterized in that said aromatic hydrocarbon is t-butylbenzene and said hydroxylated aromatic hydrocarbons comprise phenol, hydroquinone and catechol.

4. The process as set forth in claim 2, further characterized in that said aromatic hydrocarbon is t-amylbenzene and said hydroxylated aromatic hydrocarbons comprise phenol, hydroquinone and catechol.

5. The process as set forth in claim 2, further characterized in that said aromatic hydrocarbon is t-butylnaphthalene and said hydroxylated aromatic hydrocarbons comprise monohydroxynaphthalene and dihydroxynaphthalenes.

6. The process as set forth in claim 2, further characterized in that said aromatic hydrocarbon is t-amylnaphthalene and said hydroxylated aromatic hydrocarbons comprise monohydroxynaphthalene and dihydroxynaphthalenes.

References Cited

UNITED STATES PATENTS

| | | |
|---|---|---|
| 2,700,689 | 1/1955 | McCaulay et al. |
| 2,803,681 | 8/1957 | McCaulay. |

OTHER REFERENCES

Derbyshire et al., Nature, vol. 165, p. 401 (1950). Q1 N2.

McClure et al., J. Org. Chem., vol. 27, pp. 24–26 (1962). QD 241 J6.

LEON ZITVER, *Primary Examiner.*

H. ROBERTS, *Assistant Examiner.*